(12) United States Patent
Brittingham

(10) Patent No.: US 8,348,612 B2
(45) Date of Patent: Jan. 8, 2013

(54) TURBINE BLADE TIP SHROUD

(75) Inventor: Robert A. Brittingham, Piedmont, SC (US)

(73) Assignee: General Electric Company, Schenectady, NY (US)

( * ) Notice: Subject to any disclaimer, the term of this patent is extended or adjusted under 35 U.S.C. 154(b) by 1671 days.

(21) Appl. No.: 11/971,982

(22) Filed: Jan. 10, 2008

(65) Prior Publication Data
US 2009/0180896 A1 Jul. 16, 2009

(51) Int. Cl.
*F01D 5/18* (2006.01)
*F01D 5/20* (2006.01)

(52) U.S. Cl. ............. 416/96 R; 416/97 R; 416/191

(58) Field of Classification Search ............. 416/96 R, 416/97 R, 181, 189, 191
See application file for complete search history.

(56) References Cited

U.S. PATENT DOCUMENTS

| 6,471,480 | B1 * | 10/2002 | Balkcum et al. | 416/97 R |
| 6,761,534 | B1 * | 7/2004 | Willett | 416/97 R |
| 7,028,747 | B2 * | 4/2006 | Widrig et al. | 164/369 |
| 7,427,188 | B2 * | 9/2008 | Neuhoff et al. | 416/97 R |
| 7,686,581 | B2 * | 3/2010 | Brittingham et al. | 416/97 R |
| 2008/0170946 | A1 * | 7/2008 | Brittingham et al. | 416/97 R |

* cited by examiner

*Primary Examiner* — Christopher Verdier
(74) *Attorney, Agent, or Firm* — Mark E. Henderson; Ernest G. Cusick; Frank A. Landgraff

(57) ABSTRACT

A turbine blade that may include a tip shroud, one or more cooling cavities formed within the tip shroud, and at least one discrete structural element defined within at least one of the cooling cavities. The discrete structural element may include an element that structurally connects a floor of the cooling cavity to a ceiling of the cooling cavity that does not originate from, terminate in, or connect to an interior wall of the cooling cavity or an outer edge of the tip shroud.

20 Claims, 9 Drawing Sheets

TURBINE BLADE TIP SHROUD

BACKGROUND OF THE INVENTION

The present invention relates to a blade for a turbine, e.g. aircraft engine, gas turbine, steam turbine, etc. More specifically, the present invention relates to hollow cavity tip shrouds and the cooling of a turbine blade tip shroud through the use of circulating coolant through the hollow cavity. As a non-limiting example, the invention and its background are described with reference to a gas turbine.

The turbine blades of industrial gas turbines and aircraft engines operate in an extreme temperature environment. The thermal stresses and metal temperatures associated with this environment may decrease the useful operating life of the turbine blades. Cooling the turbine blades, and the component parts thereof, during operation may extend their useful operating life.

Many turbine blades include an airfoil and an integral tip shroud attached to the tip of the airfoil. The tip shroud, which attaches to the outer edge of the airfoil, provides a surface area that runs substantially perpendicular to the airfoil surface. The surface area of the tip shroud helps to hold the turbine exhaust gases on the airfoil (i.e., does not allow the exhaust gases to slide over the end of the airfoil blade) so that a greater percentage of energy from the turbine exhaust gases may be converted into mechanical energy by the turbine blades. Tip shrouds thusly improve the performance of the gas turbine engine. Further, it is desirable to have the entire outer surface of the airfoil covered by a tip shroud. However, tip shrouds and the connection they make to the airfoils become highly stressed during operation because of the mechanical forces applied via the rotational speed of the turbine. When these mechanical stresses are coupled with the thermal stresses and metal temperatures associated with extreme high temperature environment of the turbine, it becomes a challenge to design a tip shroud that will perform its intended function over the entire useful life of the airfoil.

Two possible methods of resolving this issue are to either: 1) reduce the mechanical stresses applied to the tip shrouds by reducing their weight, or 2) reduce the metal temperatures experienced by tip shrouds. As to the first, one common method for reducing tip shroud weight is to "scallop" (i.e., remove an indentation or a portion of) the overhanging tip shroud. The reduction in tip shroud material results in a reduction of the load applied to the connection made between the tip shroud and airfoil during operation. However, decreasing the surface area of the tip shroud through scalloping comes at a cost as it decreases the performance of the turbine engine because a tip shroud of less surface area has a decreased ability to hold the turbine exhaust gas on the turbine airfoil (i.e., more of the exhaust gases slide over the top of an airfoil that has a tip shroud of reduced surface area). In regard to the second alternative, reducing the metal temperatures experienced by the tip shroud by reducing the operating temperature of the gas turbine also is an undesirable solution. As one of ordinary skill in the art would appreciate, a reduction in operating temperature of the turbine results in a reduction in turbine efficiency. However, reducing the metal temperatures experienced by the tip shroud by cooling it during operation could extend the useful life of the part.

Thus, there is a need for improved systems for cooling turbine blade tip shrouds such that the metal temperatures associated with the high temperature turbine environment are reduced. The reduction in metal temperatures then will allow the part to better withstand the increased mechanical stresses associated with tip shrouds of larger surface area (i.e., unscalloped tip shrouds). Such a system would allow the tip shroud to better operate in the high temperature environment of the turbine with no scallop or the smallest scallop possible. Further, if such a system could cool the tip shroud while also reducing the weight of the tip shroud, further improvements in efficiency could be realized.

BRIEF DESCRIPTION OF THE INVENTION

The present application thus describes turbine blade that may include a tip shroud, one or more cooling cavities formed within the tip shroud, and at least one discrete structural element defined within at least one of the cooling cavities. The discrete structural element may include an element that structurally connects a floor of the cooling cavity to a ceiling of the cooling cavity that does not originate from, terminate in, or connect to an interior wall of the cooling cavity or an outer edge of the tip shroud.

These and other features of the present application will become apparent upon review of the following detailed description of the preferred embodiments when taken in conjunction with the drawings and the appended claims.

BRIEF DESCRIPTION OF THE DRAWINGS

These and other objects and advantages of this invention will be more completely understood and appreciated by careful study of the following more detailed description of the presently preferred example embodiments of the invention taken in conjunction with the accompanying drawings, in which.

DETAILED DESCRIPTION OF THE INVENTION

Figure 1:
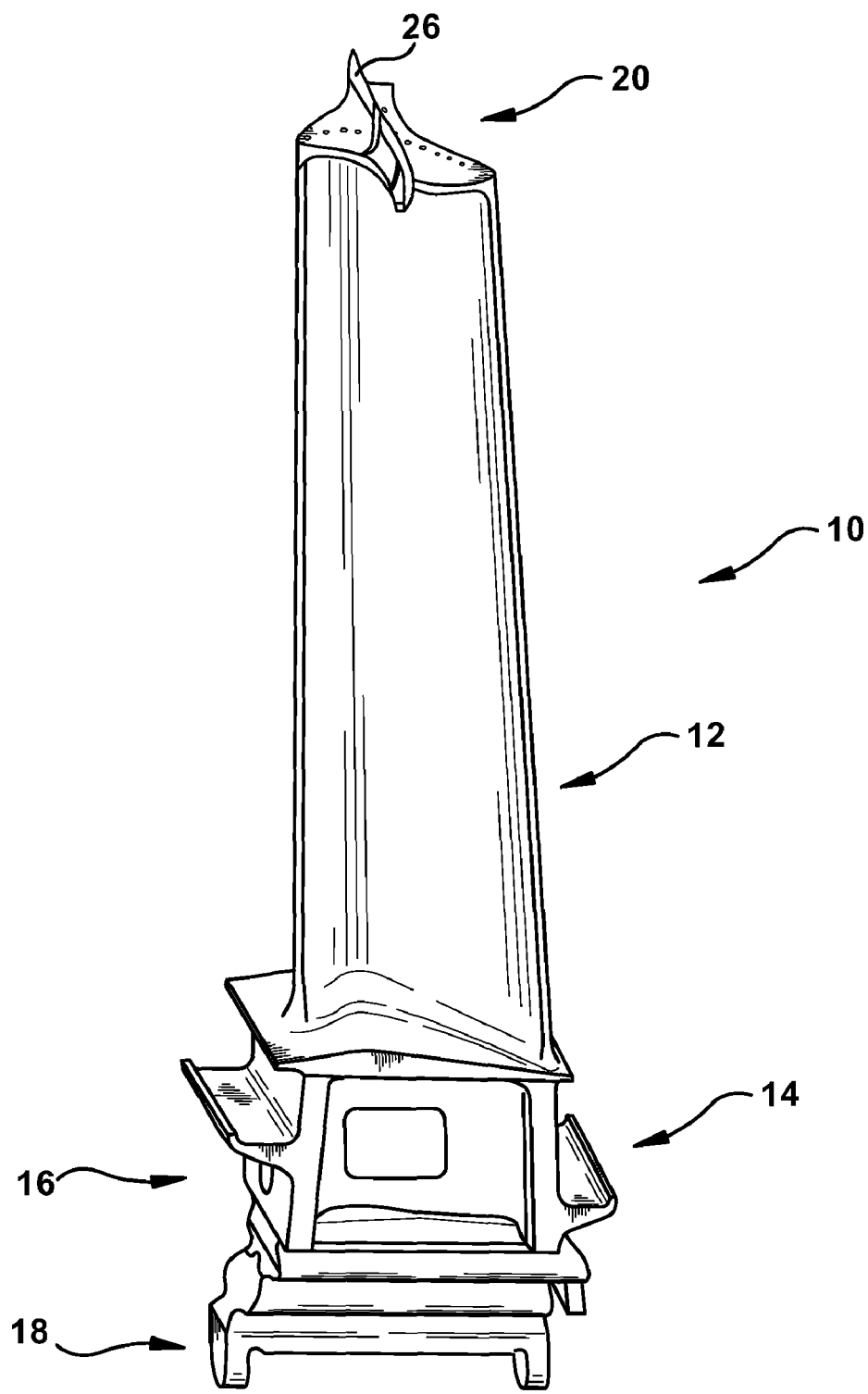
FIG. 1 is a schematic perspective view of a conventional turbine blade with tip shroud.

Referring now to the figures, where the various numbers represent like parts throughout the several views, FIG. 1 illustrates a typical blade with coolant passages exiting at a blade tip to flow over a tip shroud. As schematically illustrated therein, each turbine blade 10 is comprised of an airfoil 12 and a root 14. The airfoil 12 has a leading edge and a trailing edge. A generally concave pressure surface and a generally convex suction surface extend between the leading and trailing edges on opposing sides of the airfoil 12. In the illustrated example, the root 14 is comprised of a shank 16 and a dovetail 18 that engages a corresponding dovetail groove on the rotor to secure the turbine blade 10 to the rotor.

Figure 2:
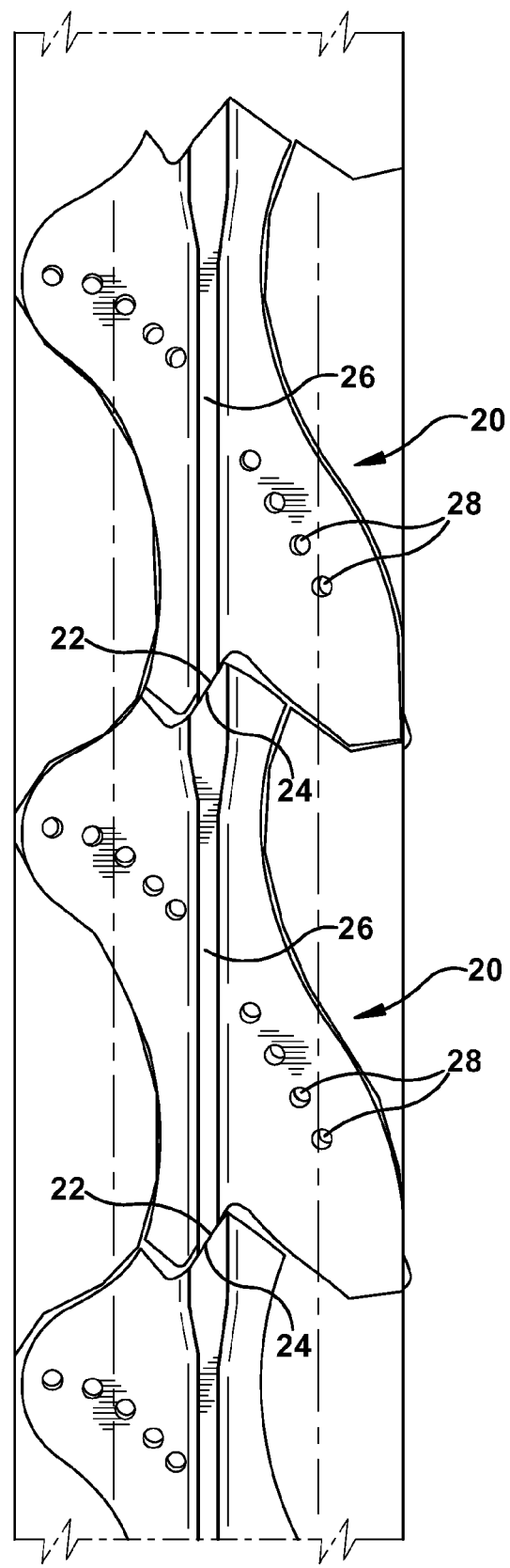
FIG. 2 is a schematic plan view of conventional tip shrouds, illustrating tip shroud scalloping.

As shown in FIGS. 1 and 2, a tip shroud 20 is formed at the tip of the airfoil 12 and extends perpendicularly outward from the surface of the airfoil 12. The tip shroud 20 has radially inward and radially outward facing surfaces and is exposed to the hot compressed gas flowing through the turbine section. Each tip shroud 20 has bearing surfaces 22,24 over which it contacts the tip shroud of an adjacent blade thereby restraining blade vibration. Furthermore, a seal rail 26 typically extends radially outward from the radially outward facing surface of the tip shroud 20 to prevent leakage of hot gas around the respective blade row. In some conventional turbine blade structures, a plurality of cooling air passages extend radially outwardly through the blade into the blade tip. In other conventional turbine blade structures, coolant passages may be defined in the airfoil. As shown in FIG. 2, coolant passage may conventionally terminate in air discharge holes 28 that allow the cooling air to discharge at the radially outward surface of the tip shroud 20.

Figure 3:
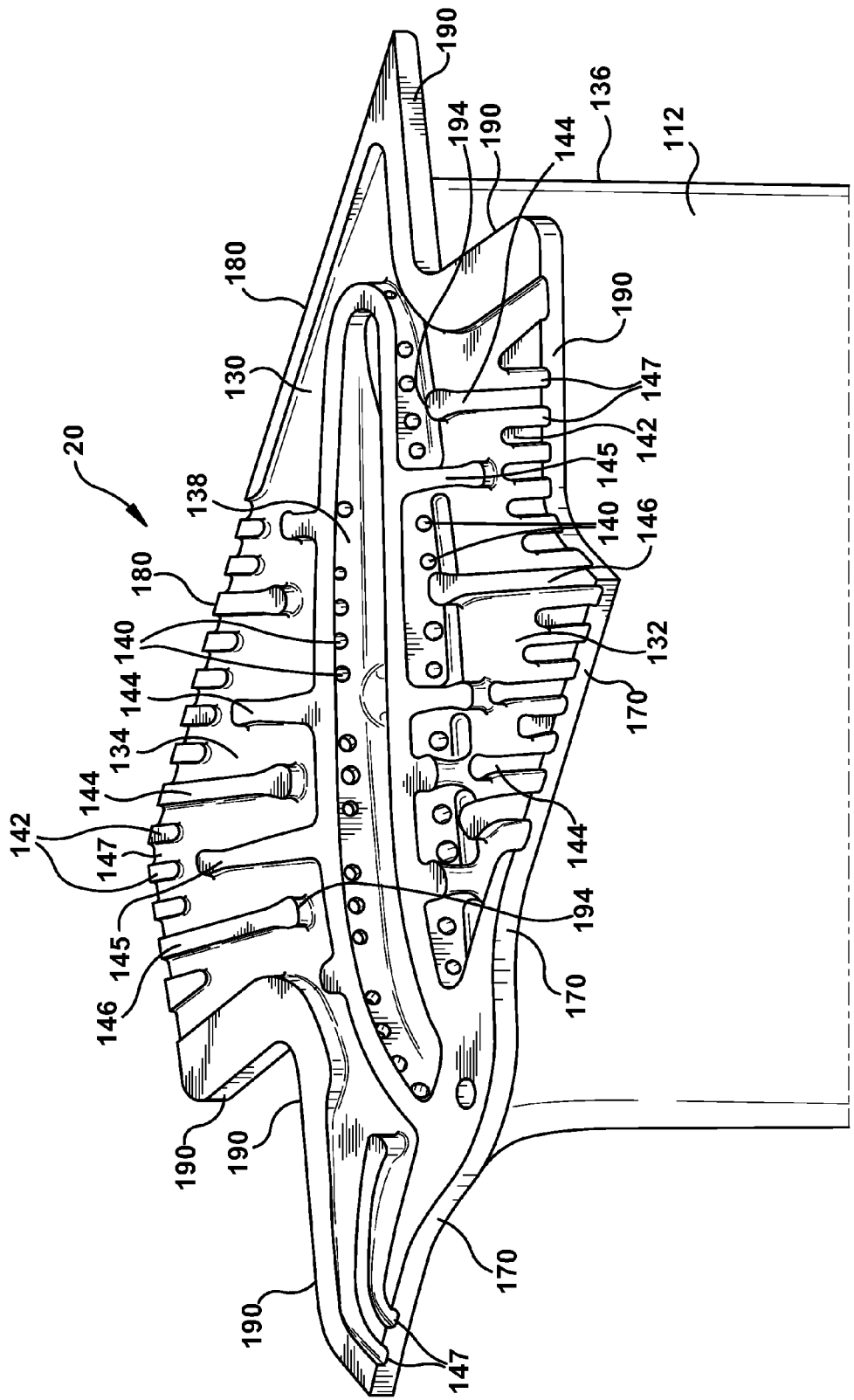
FIG. 3 is a cut-away view partly in perspective of a tip shroud having a cooling cavity according to an embodiment of the invention.

FIG. 3 illustrates an exemplary embodiment of the invention. As illustrated, the tip shroud 20 may include hollow spaces (which may include chambers, cavities, apertures, and/or passageways) defined therein. All of the hollow spaces defined within the tip shroud 20 may be in fluid communication with each other so that the hollow spaces form a continuous cooling cavity (hereafter "cooling cavity 130"). (Note that the exemplary embodiments disclosed herein are generally described with reference to the function of cooling the tip shroud by passing a coolant therethrough. This function is exemplary only and is not meant to be limiting. All of the embodiments described herein generally may be employed for reasons other than cooling. For example, all of the hollow cavities and the structural supports configurations may be used to create a lightweight structurally sound tip shroud. For the sake of brevity, the structural elements associated with forming hollow cavities in a tip shroud are described herein only with reference to its "cooling" function. However, as defined herein, all such references shall be construed also to include the possibility of using the hollow cavity and/or any of its structural elements for advantages separate from the cooling function. Thus, for example, the "cooling cavity" and/or any of its described structural elements may be used for the function of creating a lightweight structurally sound hollow tip shroud and not for the purposes of cooling the tip shroud. This is true whether the reference to a cooling function is made in the detailed description or the claims or any other part of this application.) In some embodiments, the cooling cavity 130 may include a pressure side cooling cavity 132 and a suction side cooling cavity 134 that coincide respectively with the pressure side and suction side of the airfoil 12. As illustrated, the pressure side cooling cavity 132 and the suction side cooling cavity 134 may be in fluid communication with each other along a trailing or aft edge 136 of the airfoil 112.

In a conventional manner, air may be taken into the turbine blade 10 near the dovetail 18 or shank 16 area and flow through the airfoil 12 toward the tip shroud 20. In the illustrated example, a coolant chamber 138 may be defined at the approximate center of the tip shroud 20 (substantially separating the pressure side cooling cavity 132 and the suction side cooling cavity 134) as a coolant (generally compressed air) reservoir for distribution through the tip shroud 20 via the pressure side cooling cavity 132 and the suction side cooling cavity 134. As an alternative, the coolant chamber 138 may be defined in the tip of the airfoil 12 (this embodiment is not shown). As a further alternative, the plurality of coolant passages extending through the airfoil 12 may be directly coupled to the pressure side cooling cavity 132 and the suction side cooling cavity 134 such that no coolant chamber 138 is present (see discussion below associated with the embodiment of FIG. 4).

The coolant then may flow from the coolant chamber 138 or the respective coolant passages to and through the cooling cavities 132,134. In the illustrated example, a plurality of coolant chamber apertures 140 are defined between the coolant chamber 138 and the cooling cavities 132,134. Thus, the coolant chamber 138, the pressure side cooling cavity 132, and the suction side cooling cavity 134 are all in fluid communication with each other. As such, as defined and used herein, the coolant chamber 138, the pressure side cooling cavity 132, and the suction side cooling cavity 134 form a single cooling cavity or a continuous cooling cavity in the tip shroud 20 (i.e., because all of the defined cavities/chambers/apertures/passageways within the tip shroud 20 are in fluid communication with each other). The coolant chamber apertures 140 connecting the cooling cavities 132,134 to the coolant chamber 138 may be used not only to simply connect the cooling cavities 132,134 to the coolant chamber 138, but may also be adapted to meter or control the flow into the cooling cavities 132,134 such that a desirable distribution of coolant throughout the tip shroud 20 is realized. In the alternative, the coolant chamber 138 may be open to the cooling cavities 132,134, as discussed later.

The cooling cavity 130 may have a plurality of support ribs or ribs 142,144 defined therein. In general, the ribs 142,144 are elongated structures that connect the floor (or radial floor) of the cooling cavity 130 to the ceiling (or radial ceiling) of the cooling cavity 130, as illustrated in the several figures. (As used herein, the floor of the cooling cavity 130 is illustrated in the several figures as the area around the ribs. The ceiling of the cooling cavity 130 is the portion that has been removed from the tip shroud 20 so that a view of the interior of the cooling cavity 130 may be provided.) One of the functions of the ribs 142,144 is to advantageously define the shape of the cooling cavity 130. Also, the ribs 142,144 maintain the structural strength of the hollow tip shroud 20 so that the useful life of the turbine blade 10 is not negatively impacted. The ribs 142,144 support the hollow areas of the cooling cavity 130, which allows the tip shroud 20 to be lightweight. Lightweight tip shrouds are advantageous as they reduce mechanical stresses in both the tip shroud 20 and the airfoil 12 during operation. Generally, as described in more detail below, the ribs 142,144 extend partially across the cooling cavity 130 in which they are located. In some embodiments, a plurality of the ribs 142,144 may extend across a majority of the distance across the cooling cavity 130. In some embodiments, the ribs 142,144 are approximately parallel to each other.

As illustrated, the ribs 142,144 may include a plurality of truncated ribs 142. Truncated ribs 142 generally are shorter ribs, which in some embodiments (and as illustrated), define exit apertures 147. In addition, the ribs 142,144 may include a plurality of partition ribs 144 that are substantially longer than the truncated ribs 142. (Note that some embodiments may include only a plurality of partition ribs 144. In such embodiments, holes bored at the edge of the tip shroud 20 may define the exit apertures 147.) In general and as illustrated, the partition ribs 144 are of a length such that they extend across at least a majority of the distance across the respective cooling cavity 132,134, but do not extend across the entire distance. In some embodiments, the partition ribs 144 may extend across at least 75% of the width across the cooling cavity 130. Thus, partition ribs 144 do not create separate cavities. In other words, the hollow space on either side of a partition rib 144 remains in fluid communication around at least one end of the partition rib 144.

As illustrated in FIG. 3, the partition ribs 144 may include an outward extending partition rib 145. The outward extending partition rib 145 generally may extend outwardly from the wall defining the coolant chamber 138 to a position short of the outer wall of the cooling cavity 130, thus defining a space or gap between the outward extending partition rib 145 and the outer wall of the cooling cavity 130. In some embodiments, the outer wall of the cooling cavity 130 may be defined by one of the truncated ribs 142. In such embodiments, the outward extending partition rib 145 may extend from the wall defining the coolant chamber 138 to a position short of the truncated rib 142 that defines the outer wall of the cooling cavity 130 at that location, thus defining gap between the outward extending partition rib 145 and the truncated rib 142. The partition ribs 144 also may include an inward extending partition rib 146, which generally extends inwardly from the outer wall of the cooling cavity 130 to a position short of the wall defining the coolant chamber 138, thus defining a gap between the inward extending partition rib 146 and the wall defining the coolant chamber 138. In some embodiments, both of the gaps defined by: 1) the outward extending partition rib 145 and the outer wall of the cooling cavity 130 and 2) the inward extending partition rib 146 and the wall defining the coolant chamber 138 may measure approximately 0.10 to 0.25 inches. In other embodiments, both the gaps defined by: 1) the outward extending partition rib 145 and the outer wall of the cooling cavity 130 and 2) the inward extending partition rib 146 and the wall defining the coolant chamber 138 may measure at least 0.10 inches.

As illustrated, each of the cooling cavities 132,134 may contain a plurality of partition ribs 144. In some embodiments (and as illustrated), each of the cooling cavities 132,134 may contain between 4-7 partition ribs 144. Further, as illustrated, the partition ribs 144 may be configured in an alternating arrangement. In an alternating arrangement, the placement of outward extending partition ribs 145 generally alternates with the placement of inward extending partition ribs 146. As used herein, an "alternating arrangement" shall be construed broadly to including several different alternating configurations and is not meant to be limited to strict "one for one" alternating (i.e., the arrangement requiring that each outward extending partition rib 145 be neighbored by only inwardly extending partition ribs 146). As used herein, an "alternating arrangement" shall also be construed to describe, for example, the following sequence of partition ribs: an outward extending partition rib 145—an outward extending partition rib 145—an inward extending partition rib 146—an outward extending partition rib 145—an outward extending partition rib 145—an inward extending partition rib 146. In another case, for example, an "alternating arrangement" may be used to describe this sequence: an inward extending partition rib 146—an outward extending partition rib 145—an outward extending partition rib 145—an inward extending partition rib 146—an inward extending partition rib 146—an outward extending partition rib 145—an outward extending partition rib 145. "Alternating arrangement" may be used to describe other similar sequences. The alternating arrangement strategy may effectively define a tortuous or labyrinth cooling circuit through the cooling cavities 132,134, which may be advantageous in the cooling of the tip shroud 20 via the circulation of a coolant therethrough. As used herein, a labyrinth circuit is defined generally to describe a winding or circuitous path that impedes flow, which, as described in more detail below, may be used advantageously to effectively distribute coolant throughout the tip shroud 20 during operation.

As noted above, between adjacent truncated ribs 142, exit apertures 147 may be defined for coolant flow out of the turbine blade 10. The cooling cavities 132,134, as illustrated, are disposed primarily in the plane of the tip shroud 20.

Figure 4:
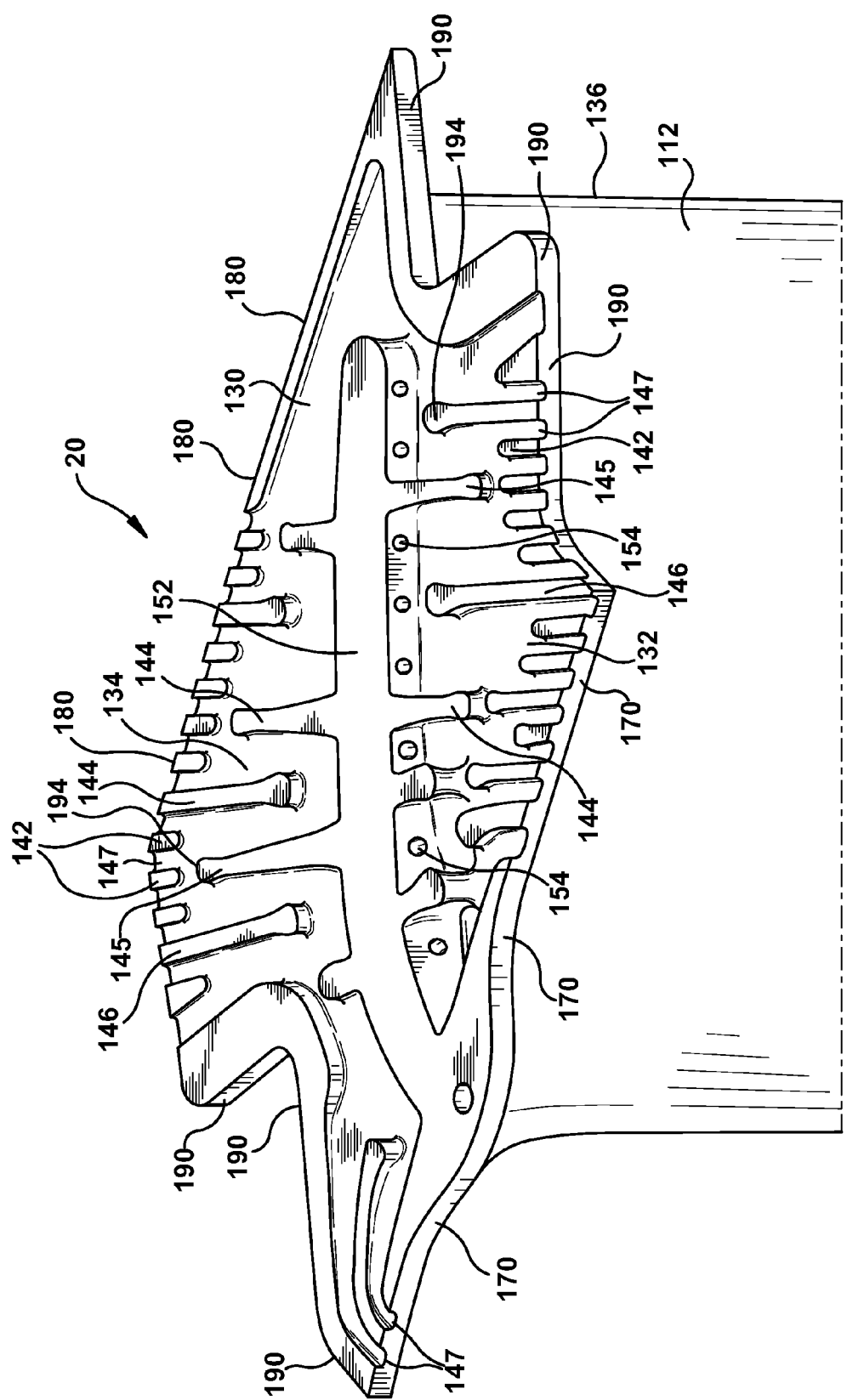
FIG. 4 is a cut-away view partly in perspective of a tip shroud having a cooling cavity according to an alternative embodiment of the invention.

FIG. 4 illustrates an alternative embodiment of the present application that does not include the coolant chamber 138 of the embodiment discussed above. The embodiment of FIG. 4 generally may include the plurality of truncated ribs 142 and partition ribs 144 in similar arrangement to that discussed above in relation of FIG. 3. However, instead of the wall defining the coolant chamber 138, the embodiment of FIG. 4 may have an interior center wall 152. The interior center wall 152 generally bisects the cooling cavity 130, thus creating (as the coolant chamber 138 did in the embodiment of FIG. 3) the pressure side cooling cavity 132 and the suction side cooling cavity 134 on each side of it. With no coolant chamber 138, the coolant passages extending through the airfoil 12 may be directly coupled to the pressure side cooling cavity 132 and the suction side cooling cavity 134 through a plurality of entry apertures 154. As illustrated, the entry apertures 154 may be located along the wall of the interior center wall 152. Other locations are possible, such as the floor of the cooling cavities 132, 134.

Further, in the embodiment of FIG. 4, the outward extending partition rib 145 generally extends outwardly from the interior center wall 152 to a position short of the outer wall of the cooling cavity 130. In some embodiments and as illustrated, the outer wall of the cooling cavity 130 may be defined by one of the truncated ribs 142. In such embodiments, the outward extending partition rib 145 of FIG. 4 may extend from the interior center wall 152 to a position short of the truncated rib 142 that defines the outer wall of the cooling cavity 130 at that location, thus defining a gap between the outward extending partition rib 145 and the truncated rib 142. Also, in the embodiment of FIG. 4, the inward extending partition rib 146 generally extends inwardly from the outer wall of the cooling cavity 130 to a position short of the interior center wall 152, thus defining a gap between the inward extending partition rib 146 and the interior center wall 152. Finally, similar to the embodiment of the FIG. 3, the partition ribs 144 may be arranged such the placement of an outward extending partition rib 145 alternates with the placement of an inward extending partition rib 146.

Alternative embodiments are illustrated in FIGS. 5 through 9. These embodiments illustrate the application of some of the features discussed above within cooling cavities 130 of a different configuration as well as the use of new elements as described in detail below. Both the embodiments illustrated in FIGS. 3 and 4 have a dividing feature in the approximate center of the tip shroud 20 (i.e., in FIG. 3 the dividing feature is the coolant chamber 138 and in FIG. 4 the dividing feature is the interior center wall 152). In some embodiments, like those of FIGS. 5 through 8, a dividing feature may not be present.

Figure 5:
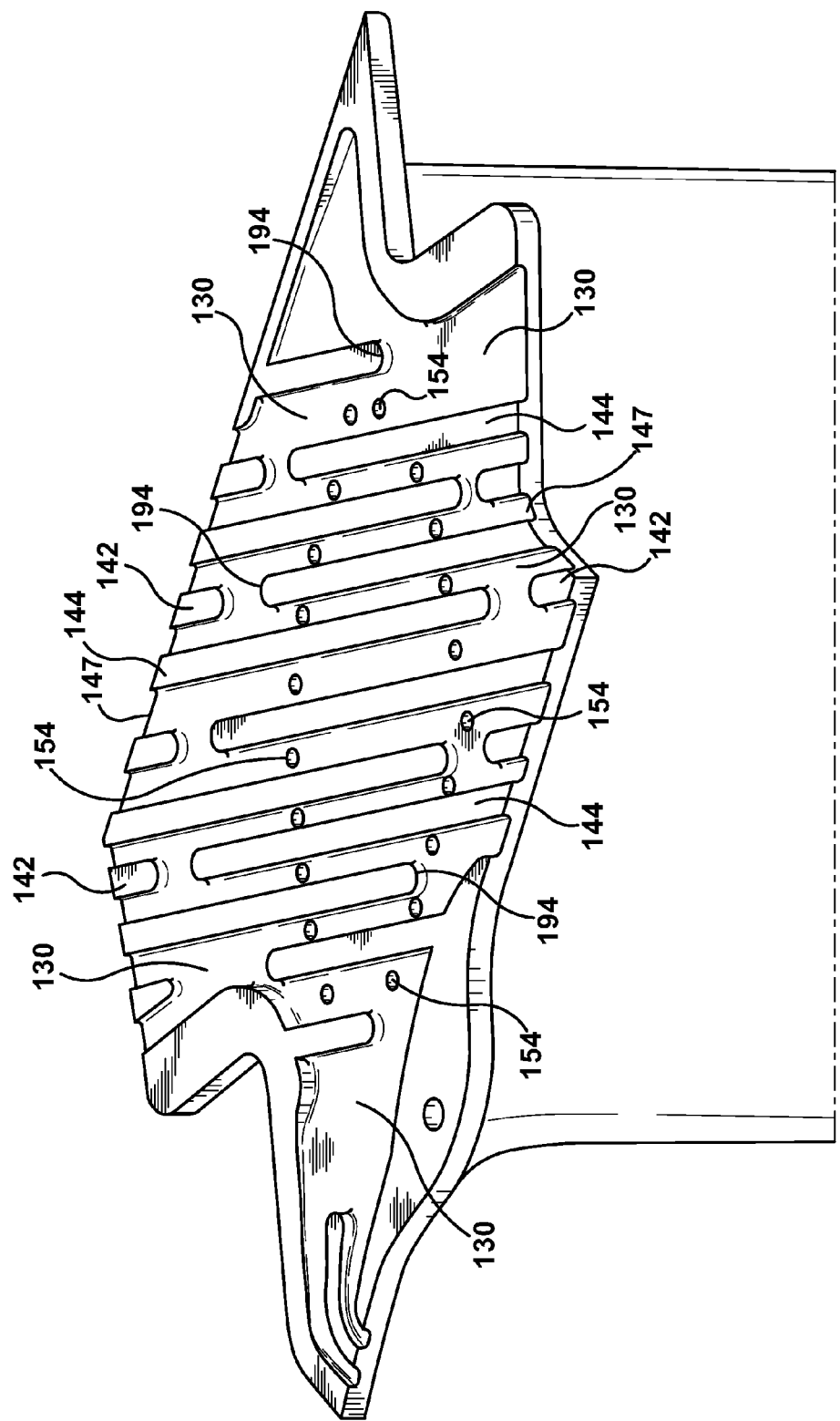
FIG. 5 is a cut-away view partly in perspective of a tip shroud having a cooling cavity according to an alternative embodiment of the invention.

FIG. 5 illustrates an alternative embodiment of a single or continuous cooling cavity 130 in a tip shroud 20 with a plurality of partition ribs 144. A plurality of truncated ribs 142 also may be present. The truncated ribs 142 may define exit apertures 147 that are concentrated along the pressure side and suction side of the tip shroud 20. With no coolant chamber 138, the coolant passages that extend through the airfoil 12 may be directly coupled to the cooling cavity 130 through a plurality of entry apertures 154. As illustrated, the entry apertures 154 may be located toward the center of the tip shroud 20, on either side of an approximate centerline of the tip shroud 20 that if drawn would roughly separate the suction side of the tip shroud 20 with the pressure side of the tip shroud 20, though other locations are possible.

Further, in the embodiment of FIG. 5, the partition ribs 144 are configured such that they originate along the outer wall of the cooling cavity 130 (i.e., a first interior wall) and extend across the tip shroud 20 toward the opposing outer wall of the cooling cavity 130 (i.e., a second interior wall). The partition ribs 144 may be of a length such that they terminate in a position short of the opposing outer wall of the cooling cavity 130. Thus, a narrow space or gap may be defined at the end of the partition rib 144 between the partition rib 144 and the opposing outer wall of the cooling cavity 130. In some embodiments and as illustrated, the outer wall of the cooling cavity 130 may be defined by one of the truncated ribs 142. In such embodiments, the partition rib 144 may extend toward the truncated rib 142 of the opposing outer wall of the cooling cavity 130 to a position short of the truncated rib 142 that defines the outer wall of the cooling cavity 130 at that location, as illustrated in FIG. 5. Thus, a narrow space or gap may be defined at the end of the partition rib 144 between the partition rib 144 and the opposing truncated rib 142. Further, as illustrated in FIG. 5, the partition ribs 144 may be configured in an alternating arrangement. In this arrangement, the placement of a partition rib 144 that extends from one of the outer walls of the cooling cavity 130 alternates with the placement of a partition rib 144 that originates from the opposing outer wall of the cooling cavity 130. See also the definition for "alternating arrangement" provided above. As before, this alternating arrangement strategy through the cooling cavity 130 may effectively define a tortuous or labyrinth cooling circuit, which may be advantageous in the cooling of the tip shroud 20 via the circulation of a coolant therethrough. Note that in alternative embodiments, the alternating partition ribs 144 may be oriented so that they generally would align perpendicularly to the orientation of the partition ribs 144 as illustrated in FIG. 5. As one of ordinary skill in the art will appreciate, other arrangements are also possible.

Figure 6:
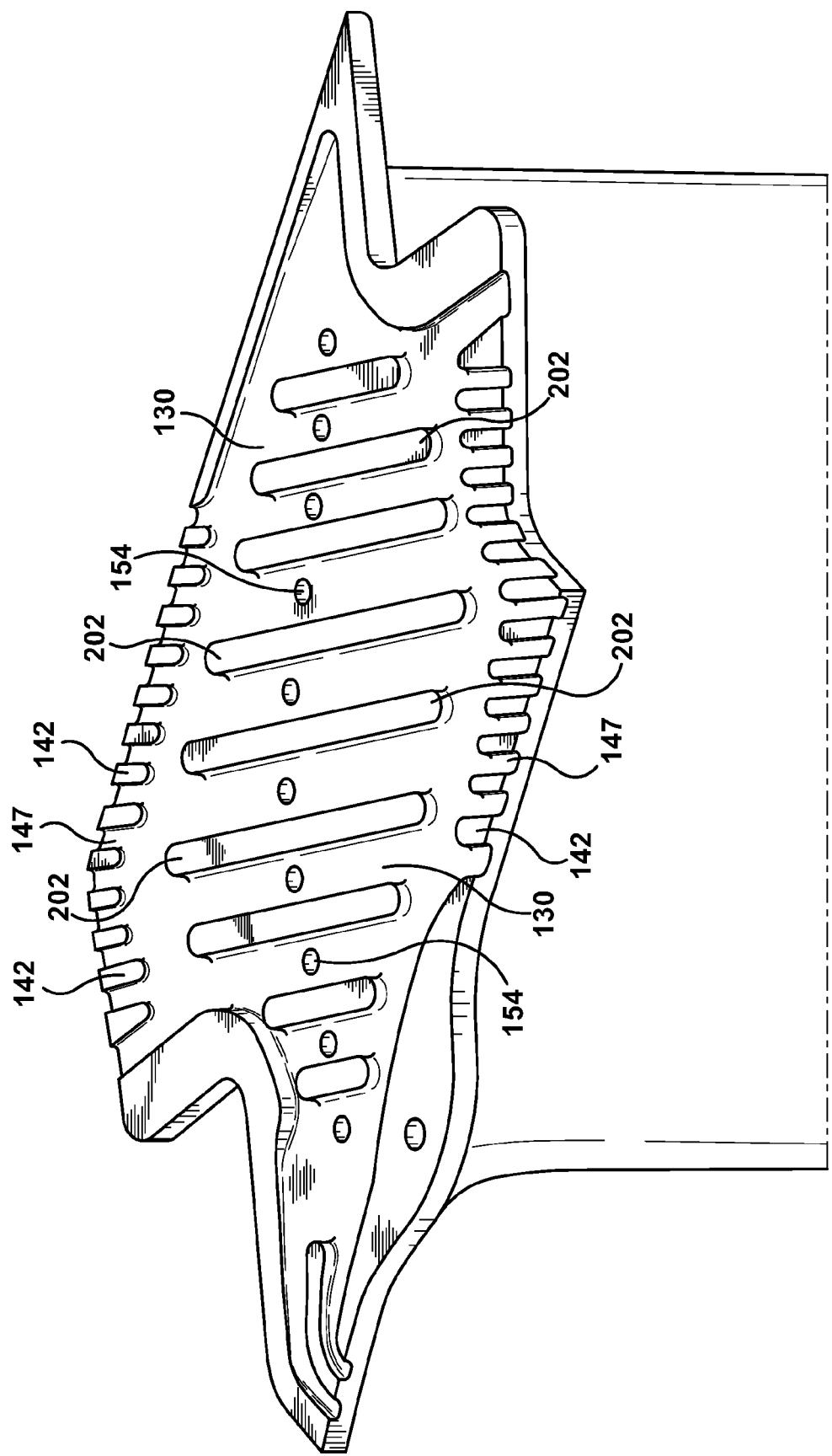
FIG. 6 is a cut-away view partly in perspective of a tip shroud having a cooling cavity according to an alternative embodiment of the invention.
Figure 7:
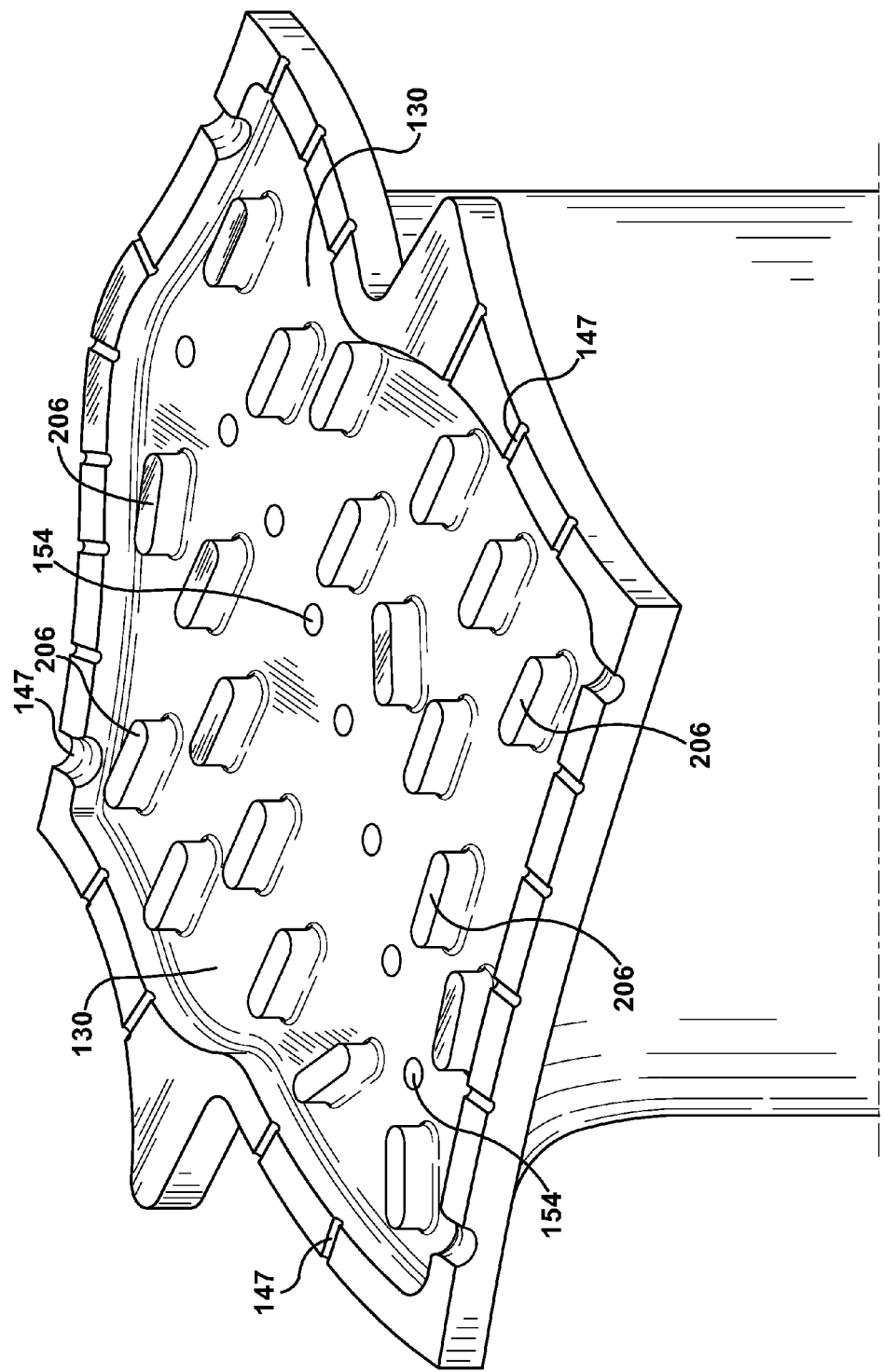
FIG. 7 is a cut-away view partly in perspective of a tip shroud having a cooling cavity according to an alternative embodiment of the invention.
Figure 8:
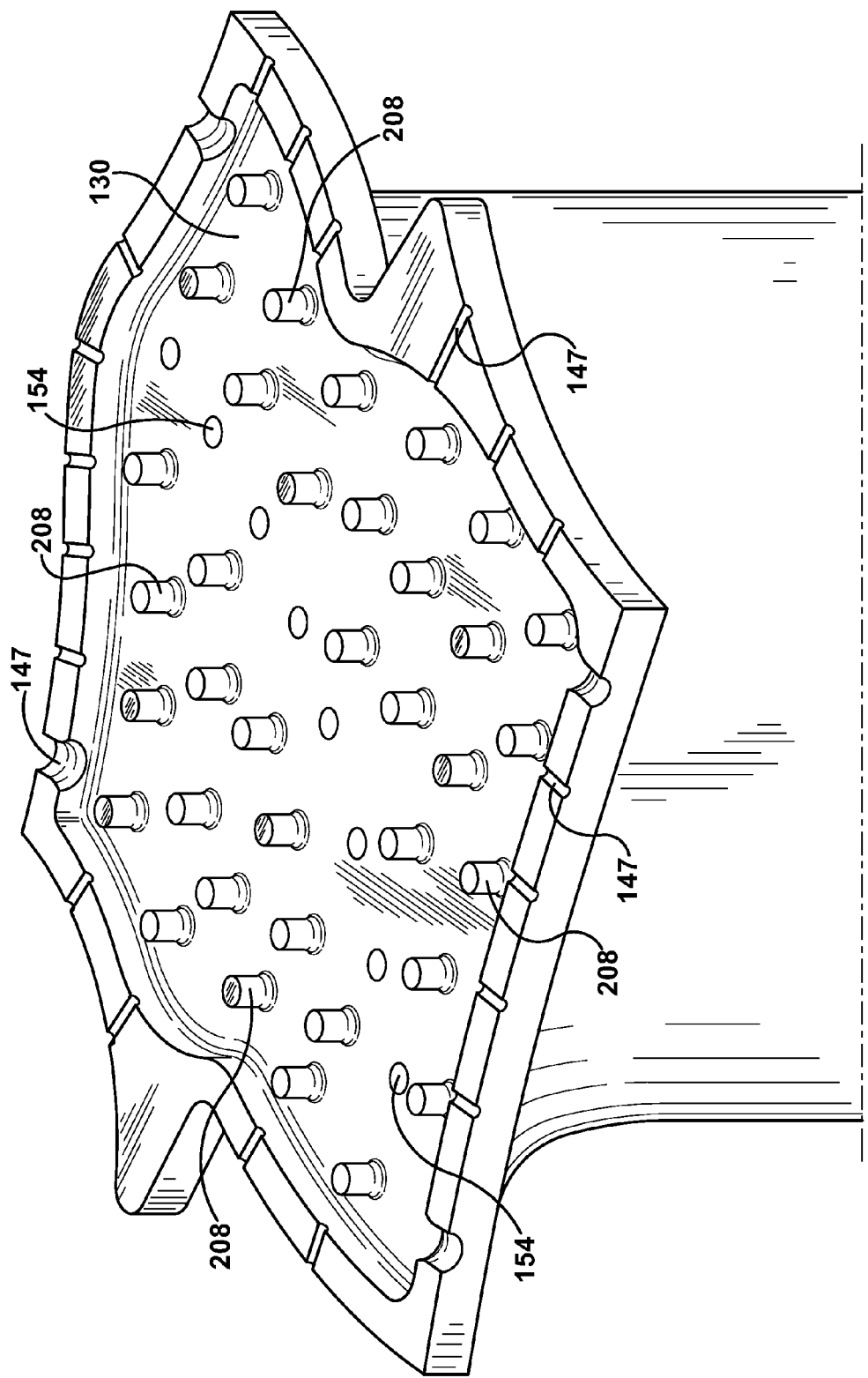
FIG. 8 is a cut-away view partly in perspective of a tip shroud having a cooling cavity according to an alternative embodiment of the invention.

FIGS. 6-8 illustrate several exemplary embodiments that include discrete structural elements within a tip shroud cooling cavity 130. As used herein, a discrete structural element is an element that structurally connects the floor of the cooling cavity 130 to the ceiling of the cooling cavity 130 and that does not originate from, terminate in, or connect to an interior wall of the cooling cavity 130 or the outer edge or periphery of the tip shroud 20. For the purpose of this definition, an interior wall of the cooling cavity 130 may include: 1) the wall defining the coolant chamber 138; 2) the outer wall of the cooling cavity 130; 3) the interior center wall 152; or 4) other similar walls that may be defined within the cooling cavity 130. Also, as used herein and previously stated, the ceiling of the cooling cavity 130 is the element that has been removed in FIGS. 3-9 so that the interior of the cooling cavity 130 may be observed. In other words, discrete structural elements generally are structural elements that, except for the connections the structural element makes with the floor and ceiling of the cooling cavity 130, are surrounded by the hollow area of the cooling cavity 130.

FIG. 6 illustrates a single or continuous cooling cavity 130 with a plurality of discrete partition ribs 202. The discrete partition ribs 202 are discrete structural elements because they connect the floor of the cooling cavity 130 to the ceiling of the cooling cavity 130 and do not originate from, terminate in, or connect to an interior wall of the cooling cavity 130 or the outer edge of the tip shroud 20. In some embodiments and as shown, a plurality of truncated ribs 142 also may be present. The truncated ribs 142 may define exit apertures 147 that are concentrated along the pressure side and suction side of the tip shroud 20. With no coolant chamber 138 in the embodiment of FIG. 6, the coolant passages that extend through the airfoil 12 may be directly coupled to the cooling cavity 130 through a plurality of entry apertures 154. As illustrated, the entry apertures 154 may be located along an approximate centerline of the tip shroud 20 that, if drawn, would approximately separate the suction side of the tip shroud 20 with the pressure side of the tip shroud 20.

Further, in the embodiment of FIG. 6, the discrete partition ribs 202 may be configured such that each begins at the approximate center of the cooling cavity 130 and extends outward toward opposing outer walls of the cooling cavity 130. The discrete partition ribs 202 may extend across at least a majority of the distance across the cooling cavity 130. In some embodiments, the discrete partition ribs 202 may extend across at least 75% of the width of the cooling cavity 130. In other embodiments, the discrete partition ribs 202 may be oriented so that they generally would align perpendicularly to the discrete partition ribs 202 illustrated in FIG. 6. As one of ordinary skill in the art will appreciate, other arrangements are also possible. The discrete partition ribs 202 may be of a length such that at one end they terminate in a position short of the outer wall of the cooling cavity 130 and at the other end they terminate in a position short of the opposing outer wall of the cooling cavity 130. Thus, two gaps may be defined at the end of each of the discrete partition ribs 202 (i.e., a first gap defined by the end of the discrete partition rib 202 and the outer wall of the cooling cavity 130; and a second gap defined by the other end of the discrete partition rib 202 and the opposing outer wall of the cooling cavity 130). In some embodiments, the first and second gap each may measure approximately 0.10 to 0.75 inches. In other embodiments, the first and second gap each may measure at least 0.10 inches. In some embodiments and as illustrated, the outer wall of the cooling cavity 130 may be defined by one of the truncated ribs 142. In such embodiments, the discrete partition rib 202 may extend toward opposing outer walls of the cooling cavity 130 to a position just short of the truncated rib 142 that defines the outer wall of the cooling cavity 130 at that location, as illustrated in FIG. 6.

FIG. 7 illustrates a single or continuous cooling cavity 130 with a plurality of discrete truncated ribs 206. The discrete truncated ribs 206 are, as defined above, discrete structural elements because they connect the floor of the cooling cavity 130 to the ceiling of the cooling cavity 130 and do not originate from, terminate in, or connect to an interior wall of the cooling cavity 130 or the outer edge of the tip shroud 20. In some embodiments (though not shown in FIG. 7), a plurality of truncated ribs that define exit apertures 147 also may be present. The truncated ribs 142 that define exit apertures 147 (as shown in previous embodiments) are not considered discrete structural elements, as defined herein, because they generally terminate in the outer edge or the periphery of the tip shroud 20. With no coolant chamber 138 in the embodiment shown in FIG. 7, the coolant passages that extend through the airfoil 12 may be directly coupled to the cooling cavity 130 through a plurality of entry apertures 154. As illustrated, the entry apertures 154 may be located along an approximate centerline of the tip shroud 20 that, if drawn, would approximately separate the suction side of the tip shroud 20 with the pressure side of the tip shroud 20.

As illustrated in FIG. 7, a plurality of the discrete truncated ribs 206 may be spaced throughout the cooling cavity 130 so that a minimum gap is maintained between each. The gaps that are maintained between each of the discrete truncated ribs 206 may be at least 0.05 inches. The discrete truncated ribs 206 may be rectangular in nature (with rounded corners in some embodiments), as shown in FIG. 7. In some embodiments, the discrete truncated ribs 206 may be approximately 0.10 to 0.75 inches long and 0.05 to 0.25 inches wide. In some embodiments and as illustrated in FIG. 7, between 15 and 25 discrete truncated ribs 206 may be defined within the cooling cavity 130.

FIG. 8 illustrates a single or continuous cooling cavity 130 with a plurality of discrete columns 208. The discrete columns 208 are, as defined above, discrete structural elements because they connect the floor of the cooling cavity 130 to the ceiling of the cooling cavity 130 and do not originate from, terminate in, or connect to an interior wall of the cooling cavity 130 or the outer edge of the tip shroud 20. With no coolant chamber 138 in the embodiment shown in FIG. 8, the coolant passages that extend through the airfoil 12 may be directly coupled to the cooling cavity 130 through a plurality of entry apertures 154. As illustrated, the entry apertures 154 may be located along an approximate centerline of the tip shroud 20 that, if drawn, would approximately separate the suction side of the tip shroud 20 with the pressure side of the tip shroud 20.

As illustrated in FIG. 8, a plurality of the discrete columns 208 may be spaced throughout the cooling cavity 130 so that a minimum gap is maintained between each of the discrete columns. The minimum gap that is maintained between each of the discrete columns 208 may be at least 0.05 inches. As illustrated, the discrete columns 208 may have a circular cross-section. In such embodiments, the diameter of the circular cross-section may measure approximately 0.05 to 0.25 inches. In other embodiments, the discrete columns 208 may have a square-shape cross-section. In such embodiments, each of the sides of the square-shaped cross-section may measure approximately 0.05 to 0.25 inches. In some embodiments and as illustrated in FIG. 8, between 5 and 50 discrete columns 206 may be defined within the cooling cavity 130.

Figure 9:
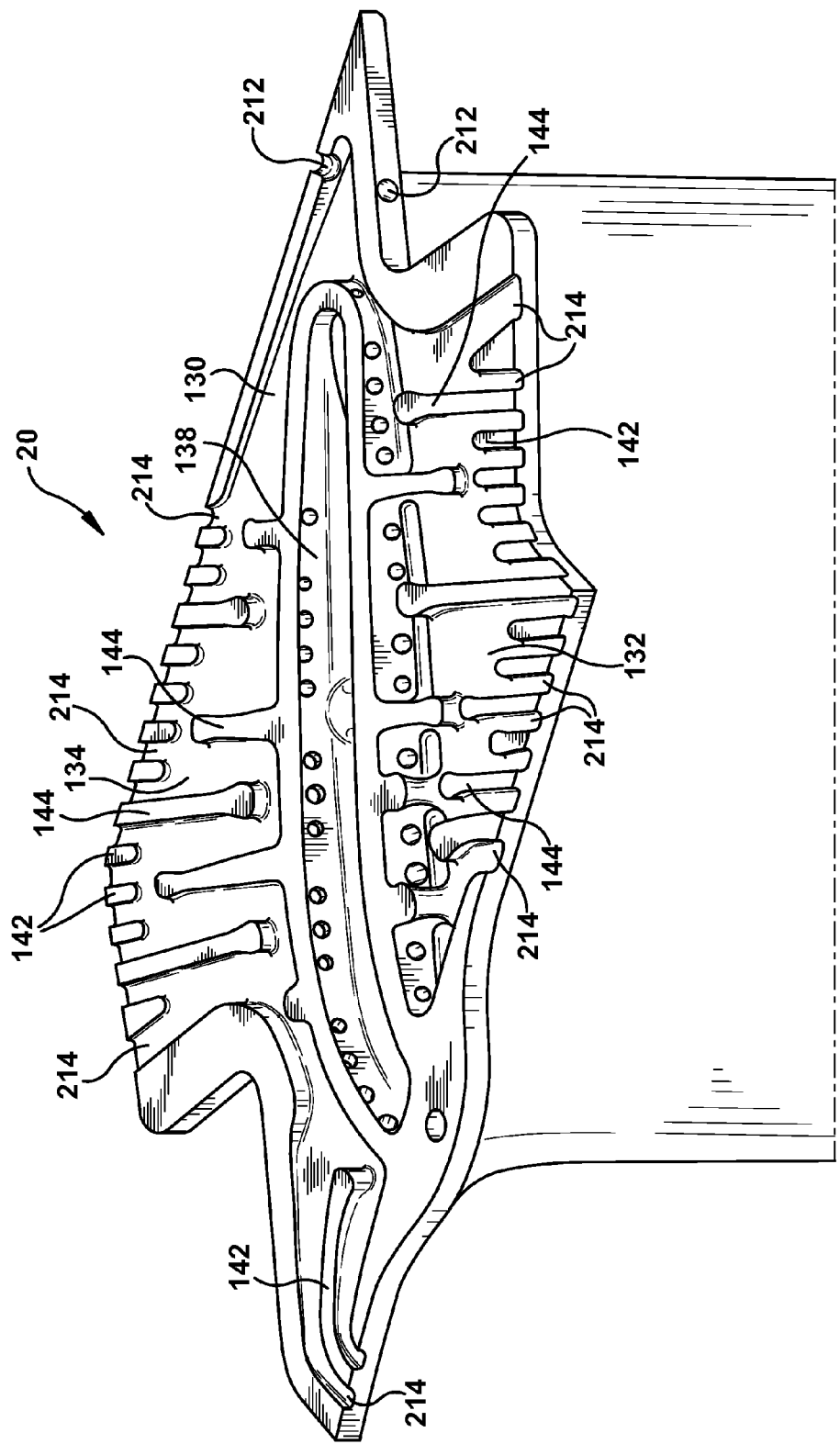
FIG. 9 is a cut-away view partly in perspective of a tip shroud having a cooling cavity according to an alternative embodiment of the invention.

FIG. 9 illustrates an exemplary embodiment that demonstrates the use of round exit apertures 212 and non-round exit apertures 214 with a tip shroud cooling cavity 130. As previously described, between adjacent truncated ribs 142 or through the outer wall of the cooling cavity 130, a plurality of exit apertures 212,214 may be defined for the pressurized coolant to exit the cooling cavity 130. As shown in the example embodiment of FIG. 9, non-round exit apertures 214 may be defined. These non-round exit apertures 214 may be rectangular in shape (some embodiments may have rounded corners), as illustrated. Not shown, the non-round exit apertures 214 also may be elliptical or oval in shape. The non-round exit apertures 214 may provide heat transfer benefits over round exit apertures. As illustrated in FIG. 9, one or more of the round exit apertures 212 also may be defined. Additional round exit apertures 212 and non-round exit apertures 214 may be provided. As one of ordinary skill in the art will appreciate, different arrangements of the round exit apertures 212 and non-round exit apertures 214 also may be possible.

Note that the embodiments described in FIGS. 3 through 9 all provide examples of a tip shroud with a single or continuous cooling cavity. Certain of the features discussed therein, however, are not limited in use to a single or continuous cooling cavity (i.e., may be used successfully in tip shrouds that have multiple separated cooling cavities that are not in fluid communication with each other). These features include: 1) ribs that extend partially across a cooling cavity such that they create a passageway between the end of the rib and an opposing structure; 2) the alternating arrangement of the ribs that extend partially across a cooling cavity; 3) the discrete structural elements; and 4) the use of non-round exit apertures and round exit apertures. The description of these features in relation to a single or continuous cooling cavity is exemplary only and not meant to be limiting.

In use, coolant (generally compressed air) may be distributed to the turbine blade 10. The coolant may travel through the coolant passages to the coolant chamber 138. The coolant may then be delivered to the cooling cavity 130 through the coolant chamber apertures 140. (Note that in the embodiments described by FIG. 4 through 8, the coolant is delivered directly to the cooling cavity 130 through the entry apertures 154.) Once in the cooling cavity 130, the coolant flows around the ribs 142,144 as necessary toward the exit apertures 147 and then exits the tip shroud 20 via the exit apertures 147, which generally are positioned along the outer wall of the cooling cavity 130. This flow of coolant through the cooling cavity 130 convectively cools the tip shroud 20.

As one of ordinary skill in the art will appreciate, the pressure conditions that exist at the edges of the tip shroud 20 vary greatly during operation of the turbine. The external pressure is high at the leading edge (shown in both FIGS. 3 and 4 as 170) of the tip shroud 20, low at the trailing edge (shown in both FIGS. 3 and 4 as 180) of the tip shroud 20, and moderate at the edges of the tip shroud 20 between the leading and trailing edges (shown in both FIGS. 3 and 4 as 190). The cooling cavity 130 of the tip shroud 20 has a higher pressure than the external pressure, however without intervention, much of the coolant will exit near the trailing edge 180 of the tip shroud 20 where the external pressure is the lowest. This tendency can cause an insufficient amount of coolant to exit the leading edge 170 of the tip shroud 20, which may result in excessive temperatures in those areas that may negatively impact the useful life of the turbine blade 10. Thus, it is desirable to cause the coolant to be preferentially distributed throughout the tip shroud 20 as it exits the turbine blade 10.

The arrangement of the ribs 142,144, as described in the embodiments above, generally creates a torturous or labyrinth cooling circuit that the coolant entering the tip shroud 20 must navigate before exiting. For example, coolant entering the tip shroud 20 near the leading edge 170 must navigate through the labyrinth cooling circuit to exit at the lower pressure trailing edge 180. In this way, the torturous path or labyrinth cooling circuit creates an impediment that discourages a disproportionate amount of the coolant from exiting at the low pressure of the trailing edge 180. The result is that coolant exits the tip shroud 20 along all of the different pressure regions of the tip shroud 20, which creates a preferential distribution of coolant throughout the tip shroud 20 during operation. This beneficial result is achieved without necessitating multiple independent or disconnected cooling cavities (i.e., cooling cavities not in fluid communication with each other) within the tip shroud 20. As one of ordinary skill in the art will appreciate, turbine blades with hollow cooling cavities generally are manufactured by an investment casting process. Having a single or continuous cooling cavity instead of multiple disconnected cavities allows for certain advantages to be realized in the investment casting process.

A further benefit of the alternating arrangement of the partition ribs 144 is that the free ends 194 of each of the partition ribs 144 are shielded by the partition rib 144 to each side of it, increasing the structural integrity of the tip shroud 20. The free end 194 of the partition rib 144 refers to the end that terminates at an open area within the cooling cavity 130 (see the free end 194 labeled in FIGS. 3, 4 and 5). In other words, the free end 194 is the end of the partition rib 144 that is opposite to the end that originates from a an interior or exterior wall in the continuous cooling cavity 130 ("interior or exterior wall of the continuous cooling cavity 130 may includes, for example, either: 1) the outer wall of the cooling cavity 130; 2) the wall of the coolant chamber 138; or 3) the interior center wall 152). As one of ordinary skill in the art will appreciate, terminating the partition rib 144 in an open area within the continuous cooling cavity 130 creates an area of increased stress. The loading that results in this stress, however, may be handled by the neighboring partition rib 144, which, because of the alternating arrangement of the partition ribs 144, may not terminate in the same area within the cooling cavity. This serves to reduce the local concentrations of stress that would have otherwise been realized at the termination of one of the partition ribs 144.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, while reference has been made in particular to the cooling of a tip shroud, the technology disclosed herein could be used on a tip shroud that is not located at the tip of the blade. In this regard, some blades have tip shrouds about mid-length of the airfoil that connect it to its adjacent blade, and the coolant passages described hereinabove could be incorporated therein.

I claim:

1. A turbine blade, comprising:
   a tip shroud;
   one or more cooling cavities formed within the tip shroud; and
   at least one discrete structural element defined within at least one of the cooling cavities;
   wherein the discrete structural element comprises an element that structurally connects a floor of the cooling cavity to a ceiling of the cooling cavity that does not originate from, terminate in, or connect to an interior wall of the cooling cavity or an outer edge of the tip shroud;
   wherein the discrete structural element comprises a structural element that, except for the connections the structural element makes with the floor and ceiling of the cooling cavity, is surrounded by the hollow area of the cooling cavity;
   wherein the discrete structural element comprises a discrete partition rib, the discrete partition rib comprising a rib that extends across at least a majority of the distance across the cooling cavity;
   wherein the discrete partition rib is formed such that it begins in the approximate center of the cooling cavity and extends outward toward the two opposing outer walls of the cooling cavity; and
   wherein the discrete partition rib is of a length such that a first gap is defined between a first end of the discrete partition rib and one of the opposing outer walls of the cooling cavity and a second gap is defined between a second end of the discrete partition rib and the other of the opposing outer walls of the cooling cavity.

2. The turbine blade according to claim 1, wherein the interior wall of the cooling cavity comprises one of a wall defining a coolant chamber, the outer wall of the cooling cavity, and an interior center wall.

3. The turbine blade according to claim 2, wherein all of the one or more cooling cavities are in fluid communication with each other.

4. The turbine blade according to claim 2, wherein the one or more cooling cavities comprises at least two cooling cavities; and
   wherein one of the two or more cooling cavities is not in fluid communication with the other cooling cavities.

5. The turbine blade according to claim 1, wherein the majority of the distance across the cooling cavity comprises at least 75% of the distance across the cooling cavity.

6. The turbine blade according to claim 1, wherein the first gap and the second gap each comprise a distance across of approximately 0.10 to 0.75 inches.

7. The turbine blade according to claim 1, wherein the first gap and the second gap each comprise a distance across of at least approximately 0.10 inches.

8. A turbine blade, comprising:
   a tip shroud;
   one or more cooling cavities formed within the tip shroud; and
   at least one discrete structural element defined within at least one of the cooling cavities;
   wherein the discrete structural element comprises an element that structurally connects a floor of the cooling cavity to a ceiling of the cooling cavity that does not originate from, terminate in, or connect to an interior wall of the cooling cavity or an outer edge of the tip shroud;
   wherein the discrete structural element comprises a structural element that, except for the connections the structural element makes with the floor and ceiling of the cooling cavity, is surrounded by the hollow area of the cooling cavity;
   wherein the discrete structural element comprises a discrete truncated rib, the discrete truncated rib comprising a rib that extends across less than a majority of distance across the cooling cavity; and
   wherein the at least one discrete structural element comprises a plurality of discrete truncated ribs, the plurality of discrete truncated ribs being approximately evenly spaced throughout the cooling cavity such that at least a predetermined minimum gap is maintained between each of the plurality of discrete truncated ribs.

9. The turbine blade according to claim 8, wherein the discrete truncated rib comprising a rib that extends across less than 25% of distance across the cooling cavity.

10. The turbine blade according to claim 8, wherein the minimum gap is at least 0.05 inches.

11. The turbine blade according to claim 8, wherein the discrete truncated ribs comprise a general rectangular shape.

12. The turbine blade according to claim 11, wherein the discrete truncated ribs may be approximately 0.10 to 0.75 inches long and 0.05 to 0.25 inches wide.

13. The turbine blade according to claim 11, wherein number of discrete truncated ribs defined in the cooling cavity is between approximately 15 and 25.

14. A turbine blade, comprising:
   a tip shroud;
   one or more cooling cavities formed within the tip shroud; and
   at least one discrete structural element defined within at least one of the cooling cavities;
   wherein the discrete structural element comprises an element that structurally connects a floor of the cooling cavity to a ceiling of the cooling cavity that does not originate from, terminate in, or connect to an interior wall of the cooling cavity or an outer edge of the tip shroud;
   wherein the discrete structural element comprises a structural element that, except for the connections the structural element makes with the floor and ceiling of the cooling cavity, is surrounded by the hollow area of the cooling cavity;

wherein the discrete structural element comprises a discrete column, the discrete column comprising a column that connects the floor of the cooling cavity to the ceiling of the cooling cavity; and wherein the at least one discrete structural element comprises a plurality of discrete columns, the plurality of discrete columns being approximately evenly spaced throughout the cooling cavity such that at least a predetermined minimum gap is maintained between each of the plurality of discrete columns.

15. The turbine blade according to claim 14, wherein the minimum gap is at least 0.05 inches.

16. The turbine blade according to claim 14, wherein the discrete column comprises a general cross-sectional square shape.

17. The turbine blade according to claim 16, wherein the length of a side of the square shape is between approximately 0.05 and 0.25 inches.

18. The turbine blade according to claim 14, wherein the discrete column comprises a general circular shape.

19. The turbine blade according to claim 18, wherein the diameter of the circular shape is between approximately 0.05 and 0.25 inches.

20. The turbine blade according to claim 14, wherein number of the discrete columns defined in the cooling cavity is between approximately 25 and 50.

* * * * *